United States Patent
Cordoba Lefler et al.

(10) Patent No.: US 10,771,481 B2
(45) Date of Patent: Sep. 8, 2020

(54) METHOD, MOBILE SWITCHING CENTRE, MSC, AND A COMPUTER PROGRAM PRODUCT FOR DETECTING INTERCONNECT BYPASS

(71) Applicant: Telefonaktiebolaget LM Ericsson (publ), Stockholm (SE)

(72) Inventors: Ana Cordoba Lefler, Prinsenbeek (NL); Alfredo Gonzalez Plaza, Rivas Vaciamadrid (ES); Jose Luis Mariz Rios, Madrid (ES)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 301 days.

(21) Appl. No.: 15/570,014

(22) PCT Filed: Apr. 29, 2015

(86) PCT No.: PCT/EP2015/059406
§ 371 (c)(1),
(2) Date: Oct. 27, 2017

(87) PCT Pub. No.: WO2016/173649
PCT Pub. Date: Nov. 3, 2016

(65) Prior Publication Data
US 2018/0159869 A1 Jun. 7, 2018

(51) Int. Cl.
*H04L 9/00* (2006.01)
*H04L 29/06* (2006.01)
(Continued)

(52) U.S. Cl.
CPC .... *H04L 63/1416* (2013.01); *H04L 29/06551* (2013.01); *H04M 3/2281* (2013.01);
(Continued)

(58) Field of Classification Search
CPC .................................................. H04L 63/1416
See application file for complete search history.

(56) References Cited

U.S. PATENT DOCUMENTS 6,400,939 B1 * 6/2002 Virtanen ............... H04W 48/02
370/328
9,609,475 B2 * 3/2017 Kraufvelin ............ H04W 64/00
(Continued)

OTHER PUBLICATIONS

Unknown, Author, "Keynote Acquires Meucci Solutions NV", Business Wire, http://www.businesswire.com/news/home/20140127005933/en/Keynote-Acquires-Meucci-Solutions-NV, Jan. 27, 2014, pp. 1-3.
(Continued)

*Primary Examiner* — Josnel Jeudy
(74) *Attorney, Agent, or Firm* — Murphy, Bilak & Homiller, PLLC

(57) ABSTRACT

A method for detecting interconnect bypass by a subscription identity in a telecommunication network, said telecommunication network comprising at least a mobile switching center, MSC, serving a plurality of subscription identities, said method comprising the steps of setting a bypass threshold value which indicates a number of originating calls from a subscription identity per pre-defined period of time, monitoring the number of originating calls from at least one of said plurality of subscription identities per said pre-defined period of time, and detecting when said monitored number of originating calls for one of said plurality of subscription identities exceeds said bypass threshold value, and issuing an alert message thereby indicating an interconnect bypass by said one of said plurality of subscription identities.

15 Claims, 5 Drawing Sheets

(51) Int. Cl.
  *H04W 12/12*   (2009.01)
  *H04M 3/22*    (2006.01)
  *H04W 8/18*    (2009.01)
  *H04M 3/08*    (2006.01)
  *H04W 24/08*   (2009.01)

(52) U.S. Cl.
  CPC .............. *H04W 8/18* (2013.01); *H04W 12/12* (2013.01); *H04W 12/1206* (2019.01); *H04L 63/0853* (2013.01); *H04M 3/085* (2013.01); *H04M 2203/6027* (2013.01); *H04M 2207/182* (2013.01); *H04W 24/08* (2013.01)

(56) References Cited

U.S. PATENT DOCUMENTS

| | | | |
|---|---|---|---|
| 2002/0120873 A1* | 8/2002 | Salmivalli | H04W 12/1206 726/32 |
| 2007/0104207 A1* | 5/2007 | Noldus | H04L 63/101 370/397 |
| 2009/0061863 A1* | 3/2009 | Huggett | H04W 12/08 455/434 |
| 2009/0069047 A1 | 3/2009 | Russell et al. | |
| 2010/0087191 A1 | 4/2010 | Kocsis | |

OTHER PUBLICATIONS

3GPP, "3rd Generation Partnership Project; Technical Specification Group Core Network and Terminals; Mobile Application Part (MAP) specification (Release 15)", 3GPP TS 29.002 V15.1.0, Sep. 2017, 1-1021.

3GPP, "3rd Generation Partnership Project; Technical Specification Group Services and System Aspects; Immediate Service Termination (IST); Service description; Stage 1 (Release 14)", 3GPP TS 22.032 V14.0.0, Mar. 2017, 1-8.

3GPP, "3rd Generation Partnership Project; Technical Specification Group Services and System Aspects; Immediate Service Termination (IST); Stage 2 (Release 14)", 3GPP TS 23.035 V14.0.0, Mar. 2017, 1-11.

Murynets, Ilona, "Analysis and Detection of SIMbox Fraud in Mobility Networks", 2014 Proceedings IEEE INFOCOM, Apr. 27-May 2, 2014, 1-8.

Prasanna, Kumar, "SIMBOX fraud detection", https://telecoedge.com/2010/02/01/simbox-fraud-detection-and-billing/, Feb. 1, 2010, 1-1.

Unknown, Author, "Comprehensive SIM Box Bypass Fraud Control", http://www.latroservices.com/managed-services/comprehensive-sim-box-bypass-fraud-control/, 2011, 1-3.

Unknown, Author, "Fraud & Security Services: A-Number Verification", Telekom Austria Group, Jun. 21, 2016, 1-3.

* cited by examiner

METHOD, MOBILE SWITCHING CENTRE, MSC, AND A COMPUTER PROGRAM PRODUCT FOR DETECTING INTERCONNECT BYPASS

TECHNICAL FIELD

The present invention generally relates to a method for detecting interconnect bypass by a subscription identity in a telecommunication network.

BACKGROUND

Interconnect bypass typically use fixed to mobile gateway components, also called Subscriber Identity Module, SIM, Boxes, to terminate international inbound calls to local subscribers by routing calls such that standard, contracted interconnect gateways are circumvented. These SIMBoxes thus enable traffic to be inserted into the telecommunication network serving those local subscribers. Interconnect bypass is also known as bypass fraud, interconnect fraud or SIM-Boxing.

In a typical example of interconnect bypass, an international voice call, initiated by a calling subscriber residing in a first country and directed to a called subscriber residing in a second country, is intercepted and transferred over the internet to a SIMBox residing in that second country. The SIMBox then injects the call back into the cellular telecommunication network of the second country.

The above described call routing circumvents the standard routing of an international voice call. In such a case, the international voice call is routed through the telecommunication provider of the calling subscriber towards the core telecommunication network of the called subscriber, which is based on agreements between the operators of the two telecommunication networks.

The effect of interconnect bypass is that the standard routing of calls between (mobile) subscribers is modified, therewith resulting in a modified and undesired claim on resources of nodes present in those telecommunication networks. For example, gateway nodes in the telecommunication networks used for the communication between these networks get circumvented by the interconnect bypass process.

Another effect of interconnect bypass is that it is making mobile telecommunication networks face a revenue loss. This is caused by the rate differentials between international and local calls. The interconnect bypass process enables international calls to be billed at local rates, whereas they should have been billed at internationals rates.

Interconnect bypass is more prevalent in the countries where the costs of terminating an international call exceed the costs of a national, local call by a considerable margin, or in the countries where international gateways are monopolized by telecommunication networks owned by the government. Organizations using SIMBoxes typically sell capacity to terminate calls cheaply in these countries.

One common approach for detecting interconnect bypass is the use of test call services to identify individual SIM cards used in SIMBoxes. Test call services are considered to be a first step in controlling revenue leakage due to bypass.

However, such an approach has several drawbacks. First, coverage is tightly coupled with the number of test calls generated. Second, this approach is susceptible to counter attacks. Test call generators may become useless within a couple of days as the SIMBoxes may be arranged to reject any calls originating from a test call generator, once such a test call generator has been detected.

Another approach for detecting interconnect bypass is to analyse network data to determine whether there are any indicators present which may indicate a bypass situation. These indicators are, for example, volume of mobile originating and mobile terminating calls over time, volume of calls from one or more cells, etc.

The downside of such an approach is that the time it takes to perform a minimally accurate historical analysis of the network data is relatively long. Typically, it may take more than a week before a potential SIMBox may be detected. Such a time frame is considered too long as SIM cards present in the SIMBoxes may already have been replaced with new SIM cards, or as the SIMBox itself may already have been relocated to another location during that time frame.

SUMMARY

It is an object of the present invention to provide for a method for detecting interconnect bypass by a subscription identity in a telecommunication network in an efficient manner.

It is another object to provide for a Mobile Switching Centre, MSC, arranged to serve a plurality of subscription identities in a telecommunication network, and for detecting interconnect bypass by any of said plurality of subscription identities in said telecommunication network in an efficient manner.

It is a further object to provide for a computer program product containing computer program code, which computer program product facilitates the method according to the present invention.

In a first aspect of the invention, there is provided a method for detecting interconnect bypass by a subscription identity in a telecommunication network, said telecommunication network comprising at least a mobile switching centre, MSC, serving a plurality of subscription identities, said method comprising the steps of:

- setting, by said MSC, a bypass threshold value which indicates a number of originating calls from a subscription identity per pre-defined period of time;
- monitoring, by said MSC, the number of originating calls from at least one of said plurality of subscription identities per said pre-defined period of time, and
- detecting, by said MSC, when said monitored number of originating calls for one of said plurality of subscription identities exceeds said bypass threshold value, and issuing an alert message thereby indicating an interconnect bypass by said one of said plurality of subscription identities.

The method is based on the insight that a subscription identity may be committing interconnect bypass in case the number of originating calls from that subscription identity exceeds a certain bypass threshold value per pre-defined period of time. This would imply that that subscription identity is setting up calls for a plurality of subscription identities, for example residing in another country.

In the context of the present invention, a subscription identity uniquely refers to a subscription card, module, hardware or the like, for example an International Mobile Equipment Identity, IMEI, or a Subscriber Identity Module, SIM, card. The SIM card may then be placed in a communication device such as a (mobile) User Equipment, UE, a tablet, a SIMBox, or any type of fixed to mobile gateway component. The communication device is then used to initiate, and to receive, calls throughout the telecommunications networks.

In the context of the present invention, interconnect bypass is also known as bypass fraud, interconnect fraud or SIMBoxing. The wording fraud is then intended to indicate that a standard, legitimate route for an international call is bypassed by using a non-desired route for the call.

In order to effectively keep track of the number of originating calls per subscription identity a de-centralized approach is introduced. This means that it is the MSC that is responsible for monitoring the number of originating calls per subscription identity. This approach makes it efficiently possible to count the number of originating calls per subscription identity in real-time, or at least quasi real-time.

Following the above, a telecommunication network may comprise a plurality of MSC's, each of which connected to multiple radio base stations. A particular radio base station then covers a certain area of the telecommunication network, also referred to as a cell. The complete telecommunication network is covered in case the method according to the present invention is implemented in each of the MSC's.

This means that implementing a method according to the present invention in each of the MSC's comprised by the telecommunication network distributes the workload for detecting the interconnect bypass among these MSC's, thereby enabling the MSC's to perform the method in real-time, or at least in quasi real-time.

The MSC monitors, i.e. counts or keeps track of, the number of originating calls per subscription identity to determine whether a bypass threshold value is exceeded. The monitoring step can be implemented in several ways. A possible solution is that the MSC counts the number of received call set-up messages initiated per calling subscription identity, per pre-defined period of time, as these call set-up messages are routed via the MSC to a called subscription identity.

According to the present invention, if the number of originating calls from a particular subscription identity exceeds the bypass threshold value, an alert message is issued thereby indicating an interconnect bypass by that subscription identity. This, however, does not mean that it is certain that the subscription identity is performing interconnect bypass. It is an indication that the subscription identity may perform interconnect bypass, which should be investigated further, for example by a bypass detection system.

The telecommunication networks may comprise any of a Long Term Evolution, LTE, network, an Evolved Packets System, EPS, network, a Universal Mobile Telecommunications System, UMTS, network and a General Packet Radio Service, GPRS, network.

In an example, the method further comprises the step of:
providing, by said MSC, a grey list comprising said at least one of said plurality of subscription identities, and wherein said step of monitoring comprises:
monitoring, by said MSC, the number of originating calls from said at least one of said plurality of subscription identities comprised by said grey list per said pre-defined period of time.

In order to reduce the workload of an MSC, it was the insight that it may not be necessary that all subscription identities served by an MSC need to be monitored. For example, if the track record of a certain subscription identity shows that the bypass threshold value for that subscription identity has never been exceeded before, it may be decided to remove that subscription identity from the monitoring step. In other words, that particular subscription identity does not need to be monitored as it is likely that that subscription identity is not performing interconnect bypass.

In order to establish the above, the MSC may provide a grey list comprising the subscription identities which need to be monitored. The subscription identities comprised by the grey list may thus be a sub set of all the subscription identities served by the MSC. The grey list may be stored, and maintained, in a memory comprised by the MSC.

In a more detailed example hereof, the grey list may be received, by the MSC, from any network node in the telecommunication network, for example a Home Subscription Server, HSS, a Home Location Register, HLR, or an Application Server, AS. The grey list may then be maintained and updated by such a network node, and an updated grey list may be distributed, by the network node, to the MSC. The MSC is then arranged to receive and store the grey list in its memory, and to use the content of the grey list to determine which subscription identities need to be monitored. Alternatively, the grey list may be entered at the MSC, for example via a user input interface such as a key pad.

In another example, the step of receiving said grey list from said HSS comprises receiving said grey list in an Immediate Service Termination, IST, message.

It was the insight that IST messages, which are already defined and in place between the MSC and the HSS, may also be used for communicating the grey list from the HSS to the MSC. This would imply that no additional signalling or message exchange between the HSS and the MSC is required, such that no additional load of the telecommunication network is introduced.

In a further example, the subscription identities are connected to said MSC via a radio base station each covering a location area, and wherein said steps of monitoring and detecting comprises:
monitoring, by said MSC, the number of originating calls from at least one of said plurality of subscription identities per said pre-defined period of time and per location area, and
detecting, by said MSC, when said monitored number of originating calls for one of said plurality of subscription identities, per base station, exceeds said bypass threshold value, and issuing an alert message thereby indicating an interconnect bypass by said one of said plurality of subscription identities.

Here, the monitoring step may be performed per location area or per set of location area. For example, it may be decided to monitor a couple of cells, i.e. a couple of radio base stations, for efficiency purposes.

In another example, the step of setting, by said MSC, a bypass threshold value, comprises the step of:
receiving, from a Home Subscription Server, HSS, comprised in said telecommunication network, said bypass threshold value.

It may be advantageous if the bypass threshold value itself is maintained centrally. The bypass threshold value may, for example, be maintained by the HSS, and may then be distributed, by the HSS, to each of the MSC's present in the telecommunication network. This would mean that the bypass threshold value is the same for each of the subscription identities of the telecommunication network. The actual monitoring step, i.e. the step which requires a computational load, is then still performed in each of the MSC's such that the load is distributed among multiple MSC's.

As mentioned before, the bypass threshold value is advantageously communicated from the HSS, to the MSC's, in Immediate Service Termination, IST, messages, which messages are already defined and in place in the telecommunication network. The IST messages are, for example, defined in the 3GPP TS 22.032 standard.

In another example, the pre-defined period of time is preferably between a minute and a week, more preferably between an minute and a day, even more preferably between a minute and an hour.

Organisations maintaining SIMBoxes for the purpose of providing interconnect bypass services will do anything in their power to make sure that their services are not detected. As such, it was the insight that these organisations may replace the SIM cards present in the SIMBoxes every now and then with new SIM cards, wherein the new SIM cards correspond to new subscription identities.

In order to combat that process, the pre-defined period of time in which the number of originating calls are monitored is specified to likely be less than the time between the replacements of SIM cards. Typically, it is assumed that the SIM cards are not replaced every couple of minutes or hours, as this would probably be very impractical. As such, it is preferred that the pre-defined period of time is between a minute and a couple of hours.

In a further example, the step of issuing said alert message comprises:
  issuing, by said MSC, said alert message to network node comprised in said telecommunication network such as a Home Subscription Server, HSS.

Typically, only one bypass detection system is in place in a telecommunication network. It may be advantageous if each of the subscription identities which exceed the bypass threshold value are reported to a centralized node, for example the HSS. The HSS may then gather all these subscription identities and may report same to the one bypass detection system. This makes sure that each of the detected subscription identities are handled uniformly. The communication of the detected subscription identities, from an MSC to the HSS may also be inserted in the already defined, and existing, Immediate Service Termination, IST, messages.

In a second aspect of the invention, there is provided a Mobile Switching Centre, MSC, arranged to serve a plurality of subscription identities in a telecommunication network, and for detecting interconnect bypass by any of said plurality of subscription identities in said telecommunication network, said MSC comprising:
  process equipment arranged for setting a bypass threshold value which indicates a number of originating calls from a subscription identity per pre-defined period of time;
  monitor equipment arranged for monitoring the number of originating calls from at least one of said plurality of subscription identities per said pre-defined period of time, and
  detect equipment arranged for detecting when said monitored number of originating calls for one of said plurality of subscription identities exceeds said bypass threshold value, thereby indicating an interconnect bypass by said one of said plurality of subscription identities.

In accordance with the present invention, different aspects applicable to the above mentioned examples of the method, including the advantages thereof, correspond to the aspects which are applicable to the Mobile Switching Centre, MSC, according to the present invention.

The bypass threshold value and/or the pre-defined period of time may, for example, be stored in a memory comprised by the MSC. Further, the at least one of the plurality of subscription identities may also be stored in the same memory, which may be a sub set of all the subscription identities served by that MSC.

The expressions, i.e. the wording, of the different aspects comprised by the MSC should not be taken literally. The wording of the aspects is merely chosen to accurately express the rationale behind the actual function of the aspects.

The MSC may comprise a processor and a memory, wherein the memory comprises instructions executable by the processors, whereby the MSC is operative to perform any of the method steps as disclosed with the examples provided above.

In the context of the present invention, a module, device, equipment, or the like may also be implemented as a computer program running on the processor.

In an example, the MSC further comprises receive equipment arranged for:
  receiving a grey list comprising said at least one of said plurality of subscription identities,
  and wherein said step of monitor equipment (506) is further arranged for:
  monitoring the number of originating calls from said at least one of said plurality of subscription identities comprised by said grey list per said pre-defined period of time.

In a more detailed example hereof the receive equipment is arranged to receive Immediate Service Termination, IST, messages.

In a further example, the process equipment is arranged for:
  receiving, from a Home Subscription Server, HSS, comprised in said telecommunication network, said bypass threshold value.

In another example, the monitor equipment is arranged for:
  monitoring the number of received call set-up messages initiated per subscription identity per said pre-defined period of time.

In a further example, the pre-defined period of time is preferably between a minute and a week, more preferably between an minute and a day, even more preferably between a minute and an hour.

In yet another example, the MSC further comprises:
  issue equipment arranged for issuing said alert message to a Home Subscription Server, HSS, comprised in said telecommunication network, for example an Immediate Service Termination, IST, message.

In a third aspect of the invention, there is provided a computer program product containing computer program code which, when executed by a Mobile Switching Centre, MSC, cause the MSC to implement the method according to any of examples as described above.

In a fourth example, there is provided a Mobile Switching Centre, MSC, arranged to serve a plurality of subscription identities in a telecommunication network, and for detecting interconnect bypass by any of said plurality of subscription identities in said telecommunication network, said MSC comprising:
  process module for setting a bypass threshold value which indicates a number of originating calls from a subscription identity per pre-defined period of time;
  monitor module for monitoring the number of originating calls from at least one of said plurality of subscription identities per said pre-defined period of time, and
  detect module for detecting when said monitored number of originating calls for one of said plurality of subscription identities exceeds said bypass threshold value, thereby indicating an interconnect bypass by said one of said plurality of subscription identities.

The above-mentioned and other features and advantages of the invention will be best understood from the following description referring to the attached drawings. In the drawings, like reference numerals denote identical parts or parts performing an identical or comparable function or operation.

DETAILED DESCRIPTION

Figure 1:
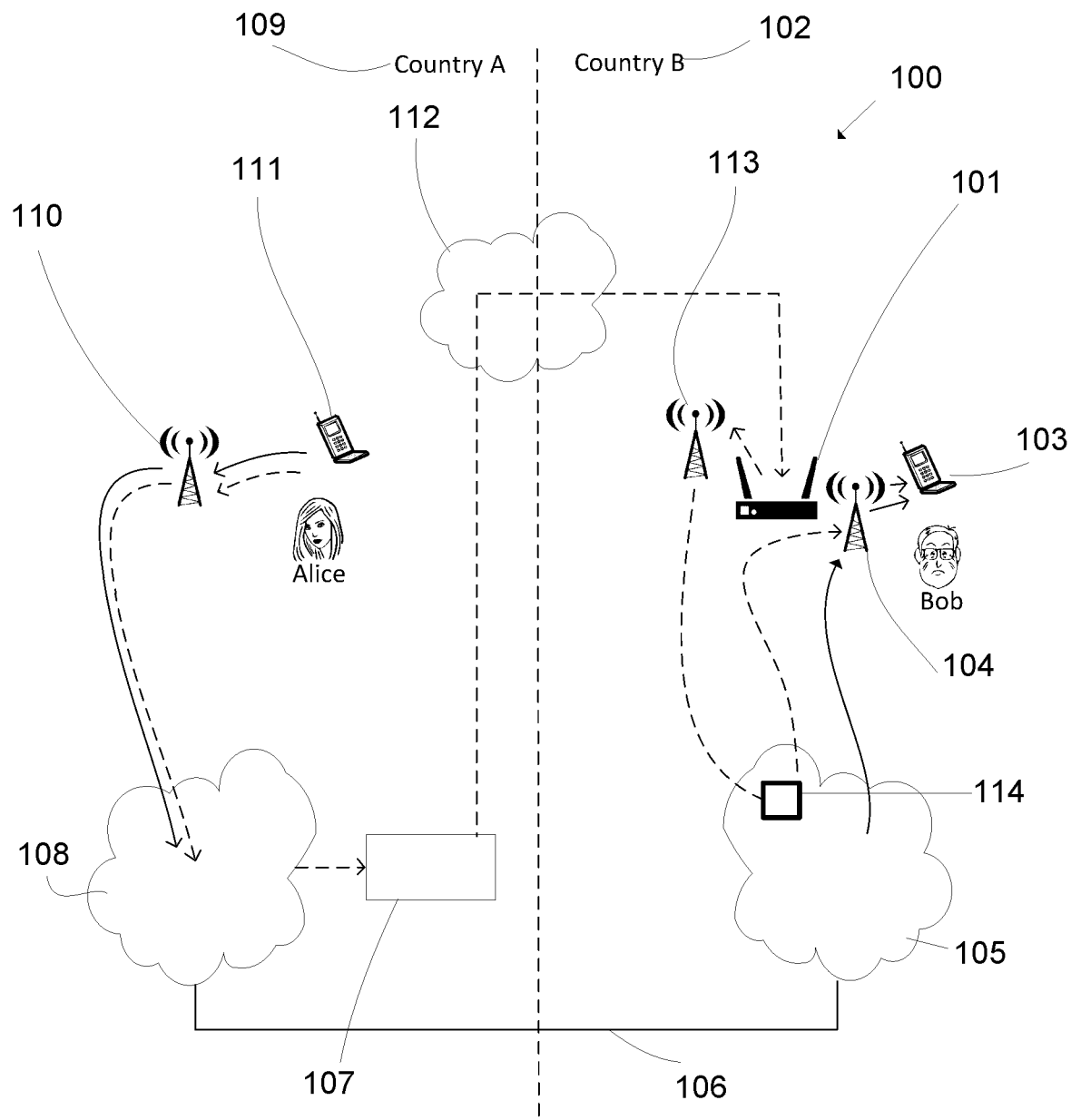
FIG. 1 is a block diagram illustrating a typical example of interconnect bypass.

FIG. 1 is a schematic diagram 100 illustrating a typical example of interconnect bypass, more specifically interconnect bypass for international calls. For simplicity, it is assumed that there is only one intermediate hop connection between a pair of countries, i.e. from country A 109 to country B 102. Actual interconnect bypass is often more complex, involving multiple intermediate steps.

An international carrier, or the operator of a first core telecommunication network 108 may select a so called legitimate carrier 106 which indicates a standard, legitimate path for connecting the core of the first telecommunication network 108 to the core of the second communication network 105. Alternatively, the international carrier, or the operator of the first core telecommunication network 108 may select an alternative route, i.e. an non-desired route 107 which indicates an interconnect bypass path, making use of a Subscriber Identity Module Box, SIMBox 101 deployed in country B 102. This is explained in more detail here after.

In the present situation, a user "Alice", having a calling User Equipment, UE, 111 and residing in country A 109, is trying to call the user "Bob", having a called UE 103 and residing in country B 102. Here below, the standard, conventional routing of the call from the calling UE 111 to the called UE 103 is described first. Then, the routing of the call from the calling UE 111 to the called UE 103 is described in case a SIMBox 101 is deployed in country B 102.

In the context of the present invention, the wording "subscription identities" is used to uniquely refer to a subscription card, module, hardware or the like, for example an International Mobile Equipment Identity, IMEI, or a Subscriber Identity Module, SIM, card. The SIM card may be placed in a communication device such as a (mobile) UE, a tablet, a SIMBox, or any type of fixed to mobile gateway component.

The calling UE 111 is served by a first base station 110, also referred to as e.g. "evolved nodeB", "eNB", "eNodeB, "NodeB", "B node", or Baste Transceiver Station, BTS, depending on the technology and terminology used. In this explanation, the first base station 110 is e.g. an eNodeB of an evolved UMTS Terrestrial Radio Access network, which first base station 110 resides in country A 109.

The first base station 110 is connected to the first core telecommunication network 108, for example the evolved packet core of a Long Term Evolution, LTE, telecommunication network.

In the standard, conventional situation the call originating from the calling UE 111 is routed through the first core telecommunication network 108 via the legitimate carrier 106 towards country B 102. Based on an agreement between the operator of the second core telecommunication network 105 and the legitimate carrier 106, the call is routed to the second core telecommunication network 105. The legitimate carrier 106 pays the operator of the second core telecommunication network 105 a fee in order to have the call terminated.

The call is then routed via a Mobile Switching Centre, MSC, 114 comprised by the second core telecommunication network 105 directly to the second radio base station 104. To be clear, the second radio base station 104 resides in country B 102, and serves the called mobile UE 103 owned by Bob.

In case an international bypass route, i.e. an non-desired route, is in place towards country B 102, then the following path between the calling UE 111 and the called UE 103 is established. In this case, an international carrier intercepts and routes the call in the first core telecommunication network 108, and forwards the call to country B 102 over a public network 112, such as the internet. Typically a Voice over Internet Protocol, VoIP, is used to transfer the call. Alternatively, user "Alice", having calling User Equipment, UE, 111, sets up a VoIP call itself to country B 102 over the public network 112.

A SIMBox 101 is placed in country B 102 to which the call is routed. The SIMBox 101 is able to receive the call over the public network 112 and is able to transform this call into a local mobile call to the called UE 103. To do so, the SIMBox 101 connects to the third radio base station 113, which routes the local mobile call via an MSC, comprised by the second core telecommunication network 105, to the second radio base station 104 serving the called UE 103 of Bob, thereby establishing a national call in view of the second core telecommunication network 105 although the call has an international character from the first core telecommunication network 108 to the second core telecommunication network 105.

The SIMBox 101 may comprise a plurality of SIM cards such that the SIMBox 101 is able to initiate a plurality of calls at the same time. Each of these SIM cards may further be replaced every now and then, and/or the SIMBox 101 itself may be relocated every now and then to complicate any interconnect bypass detection process.

Different type of solutions already exist for detecting interconnect bypass in a telecommunication network. However, each of these solutions have drawbacks which are overcome by the method according to the present invention.

Solutions utilizing offline type of network data collection need a relative long time, for example more than a week, to perform a minimally accurate historical analysis that is able to detect a potential interconnect bypass situation properly. In practical situation, a week may be too long, as the SIM cards in a SIMBox 101 may be replaced each day, thereby circumventing the detection process.

Solutions utilizing online type of network data collection may be able to detect potential interconnect bypass situations in less than a day with a reasonable level of accuracy, by deploying a large network data collection infrastructure that, however, requires device investments and that introduces an extra load into the telecommunication network.

The basic idea of the invention is focused on the way how interconnect bypass indicators are obtained. One of the interconnect bypass indicators, for example in the case a SIMBox 101 is deployed, is that many calls originate from the same subscription identity, for example a single SIM card hosted in the SIMBox 101. The basic concept of the invention is that the MSC/VLR 114 should monitor, in real-time or quasi real-time, the number of calls originating from subscription identities, and that the MSC/VLR 114 should then report the subscription identities which exceed a certain bypass threshold value.

It is realized that all calls originating from a fixed to mobile gateway component, for example a SIMBox 101, travel the same MSC/VLR 114, regardless the called UE, and that the MSC/VLR 114 is able to count the number of originating calls from any subscription identity.

The subscription identity may, for example, relate to a Mobile Station International Subscriber Directory Number, MSISDN, or an International Mobile Equipment Identity, IMEI.

Figure 2:
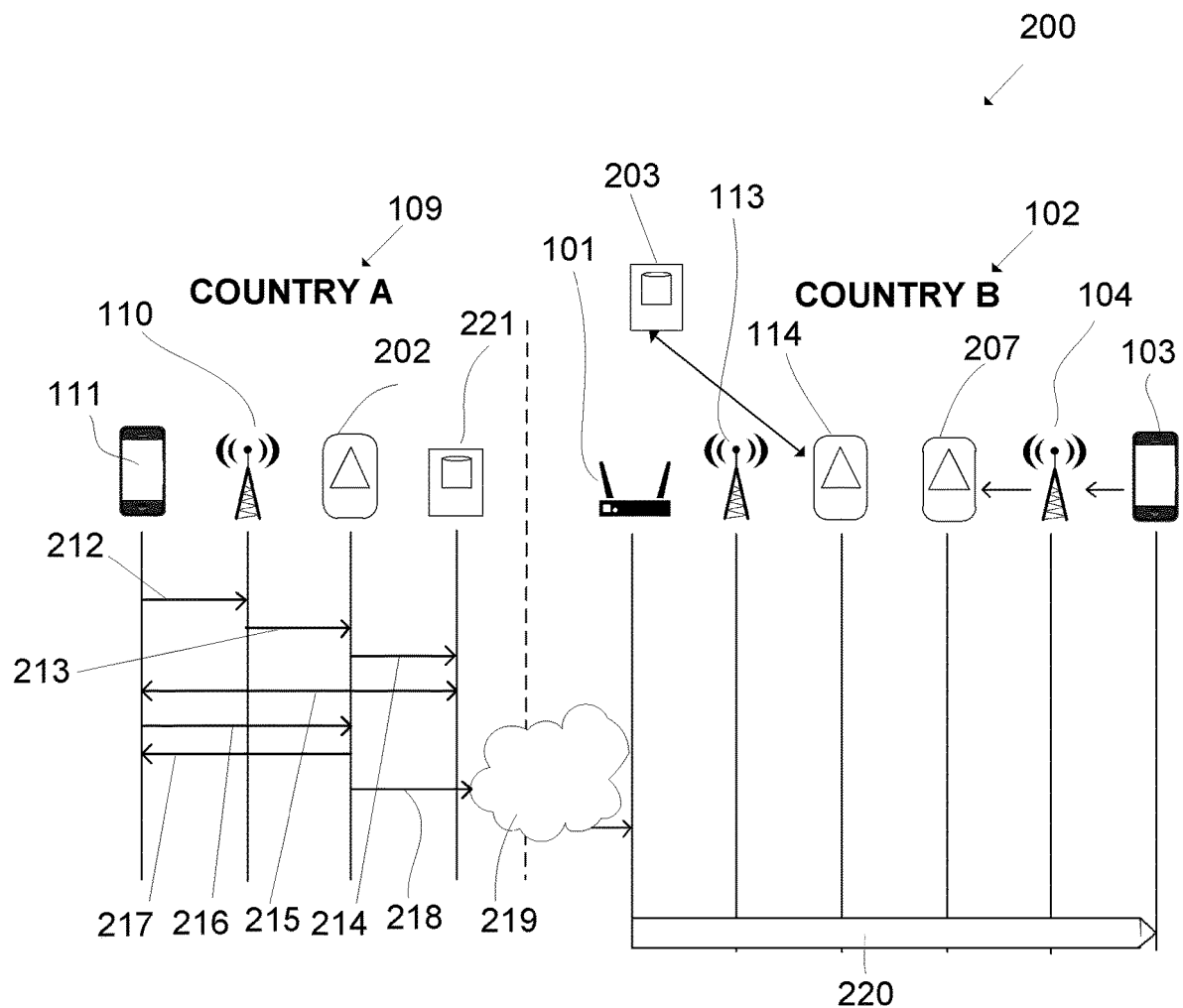
FIG. 2 is a signalling diagram illustrating an exchange of signals in an embodiment of the method.

FIG. 2 is a signalling diagram 200 illustrating an exchange of signals in an embodiment of the method.

For ease of the explanation it is assumed that the calling UE 111 has a subscription to a home network 108 and that the UE 111 is physically located in country A where the home operator A of UE 111 has deployed its network 108. Initially, when the calling UE 111 is switched ON, the International Mobile Subscriber Identity, IMSI, attach procedure is executed. This procedure is required for the Mobile Switching Centre/Visiting Location Register 202, comprised by operator A's mobile network 108, to register the calling UE 111 in the telecommunication network. If the calling UE 111 has changed its Location area while it was powered off, the IMSI attach procedure will also lead to a Location update procedure.

Here, the calling UE 111 resides in country A 109, and initiates a channel request message 212 towards the first base station 110 over, for example, a Random Access Channel, RACH. The first base station 110 then provides 213 this request as well as the Temporary Mobile Subscriber Identity, TMSI, of the calling UE 111 to the MSC/VLR 202.

The MSC/VLR 202 performs 214 an identification authentication request at the Home Subscriber Server, HSS 221, comprised by the operator A's mobile network 108, to determine, amongst others, whether the calling UE 111 is entitled to use the telecommunication network.

Once the above mentioned procedural attachment steps are performed, the authentication, the new Temporary Mobile Subscriber Identity, TMSI, and probably other parameters are communicated 215 between the HSS 221 and the calling UE 111. Then, all parameters are in place for the calling UE 111 to set up the call to the called UE 103.

In order to establish a call between the calling UE 111 and the called UE 103, the calling UE 111 first sends a call setup message 216 to its MSC/VLR 202, which, in turn, provides 217 the calling UE 111 with the channel the calling UE 111 may use for the call.

The call is then routed 218 via an alternative route, i.e. a non-desired route 219, which transfers the call over the internet, for example using Voice over Internet Protocol, VoIP, to a SIMBox 101 placed in country B 102. The call thus ends in the SIMBox 101.

The SIMBox 101 is arranged to receive the incoming call, over the Internet, and to transform that call in a local mobile call to the called UE 103. The call then gets routed via the third base station 113, to the corresponding MSC/VLR 114 of the SIMBox 101, to the MSC/VLR 207 corresponding to the called UE 103, to the second base station 104 before the call is delivered to the called UE 103. Once the call is delivered to the called UE 103, a local call is established 220 between the SIMBox 101 and the called UE 103. It might also occur that the SIMBox 101 is subscribed to the same network where the called UE 103 is subscribed to, thereby enabling the situation that the MSC/VLR 114 and MSC/VLR 207 are the same entity.

The method for detecting such an interconnect bypass by the SIMBox 101, i.e. referred to by a subscription identity, according to the present invention, is suggested to take place in the MSC/VLR 114 corresponding to the SIMBox 101.

In the present situation, a bypass threshold value is received, by the MSC/VLR 114, from a HSS 203, comprised by the mobile network of the operator maintaining HSS 203 and MSC/VLR 114. The bypass threshold value indicates the number of originating calls from a single subscription identity, for example referring to the SIMBox 101, which are allowed within a pre-defined period of time. In case a particular subscription identity exceeds the bypass threshold value it is considered to be suspicious, i.e. it may be involved in an interconnecting bypass process.

It is realized that it is advantageous if the bypass threshold value itself is maintained centrally. The bypass threshold value may, for example, be maintained by the HSS 203, and may then be distributed, by the HSS 203, to each of the MSC's present in the telecommunication network. This would mean that the bypass threshold value is the same for each of the subscription identities of the telecommunication network. The actual monitoring step, i.e. the step which requires a computational load, is then still performed in each of the MSC's such that the load is distributed among multiple MSC's.

The MSC/VLR 114 will then monitor the number of originating calls from at least one of the plurality of subscription identities per pre-defined period of time. As such, the MSC/VLR 114 will count the number of originating calls which are initiated by the SIMBox 101 over time.

Finally, the MSC/VLR 114 will detect when the monitored number of originating calls for one the subscription identities exceeds the bypass threshold value, and will issue an alert message thereby indicating a possible interconnect bypass by that subscription identity, such that it can be investigated further by another entity or system.

Figure 3:
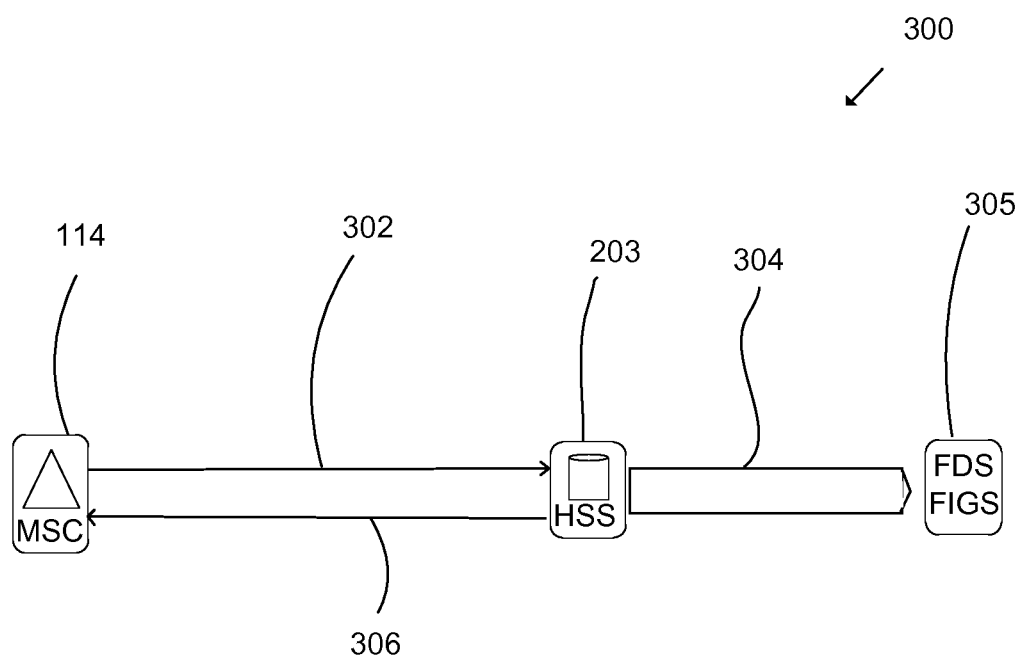
FIG. 3 is a signalling diagram illustrating an exchange of Immediate Service Termination, IST, messages in an embodiment of the method.

FIG. 3 is a signalling diagram 300 illustrating an exchange of Immediate Service Termination, IST, messages in an embodiment of the method.

Here, the idea is to add new attributes in the IST Alert message 302 from the MSC/VLR 114 to the HSS 203, and the IST Alert message 306 from the HSS 203 to the MSC/VLR 114. Table 1 and table 2 below indicate the presently defined content of the IST Alert message 302, wherein it is defined that the MSC/VLR 114 is able to handle IST alerts, and what the attributes of the ist-alert look like.

TABLE 1

| Operation ist-Alert |
|---|
| FROM MAP-OperationAndMaintenanceOperations {<br>itu-t identified-organization (4) etsi (0) mobileDomain (0)<br>gsm-Network (1) modules (3)<br>map-OperationAndMaintenanceOperations (6)<br>version13 (13)}<br>ist-Alert, |

TABLE 2

| ist-Alert |
|---|
| ist-Alert OPERATION ::= { --Timer m<br>ARGUMENT<br>IST-AlertArg<br>RESULT<br>IST-AlertRes<br>-- optional<br>ERRORS {<br>unexpectedDataValue \|<br>resourceLimitation \|<br>unknownSubscriber \|<br>systemFailure \|<br>facilityNotSupported}<br>CODE local:87 } |

The added attributes in the IST-AlertArg should then include the optional attributes IMEI, and istThreshold, see Table 3.

TABLE 3

| ist-AlertArg, IMEI and istThreshold |
|---|
| IST-AlertArg ::= SEQUENCE{<br>imsi [0] IMSI,<br>imei IMEI OPTIONAL<br>istThreshold IstTreshold OPTIONAL,<br>extensionContainer [1] ExtensionContainer OPTIONAL, |

The istThreshold is a suggested attribute defined to indicate, amongst other, the bypass threshold value, see table 4.

TABLE 4

| istThreshold |
|---|
| IstThreshold ::= ENUMERATED {<br>longCallDuration (0), |

TABLE 4-continued

| istThreshold |
|---|
| multipleOutgoingCallsFromSameSubscriber (1)<br>multipleOutgoingCallsFromSameDevice (2)<br>} |

The above attribute longCallDuration is the default behaviour of the IST Alert message as defined in the 3GPP TS 220.32 and the 3GPP TS 23.035 standards.

The added attributes multipleOutgoingCallsFromSameSubscriber and multipleOutgoingCallsFromSameDevice are directly related to the bypass threshold value. As such, the bypass threshold value relates to the number of originating calls from one subscriber and/or relates to the number of originating calls from the subscription identity.

With longCallDuration the default behaviour of the IST Alert is maintained, with the other two possible values of the IstThreshold, the IST Alert is enhanced to monitor in the MSC/VLR 114, multiple calls for the same IMSI or for the same IMEI, and from the same cell id, in the IST Timer specified.

In order to provide to the MSC/VLR 114 with the correct threshold values to monitor for an IST related Subscriber, the InsertSubscriberData operation, the HSS 203 will inform the MSC/VLR 114 about the Subscriber data, when the IST functionality is needed, there will be new attributes, as optional, added as part of the istAlertTimer to complete the new thresholds to detect possible SIMBoxes.

A Bypass Detection System, BDS, and or Bypass Information Gathering System, BIGS, can request IST functionality for the subscribers; also these systems can interrogate Mobile Positioning Systems for the subscribers with an IST Alert, but in this example the known position is the Location Area that the MSC/VLR 114 is aware of.

This is a current Insert Subscriber DataArg, ISD, Arg definition:

TABLE 5

| Current ISD Arg definition | | |
|---|---|---|
| InsertSubscriberDataArg ::= SEQUENCE { | | |
| imsi | [0] IMSI | OPTIONAL, |
| COMPONENTS OF | SubscriberData, | |
| extensionContainer | [14] ExtensionContainer | OPTIONAL, |
| ... , | | |
| naea-PreferredCI | [15] NAEA-PreferredCI | OPTIONAL, |
| -- naea-PreferredCI is included at the discretion of the HLR operator. | | |
| gprsSubscriptionData | [16] GPRSSubscriptionData | OPTIONAL, |
| roamingRestrictedInSgsnDueToUnsupportedFeature [23] | | NULL |
| OPTIONAL, | | |
| networkAccessMode | [24] NetworkAccessMode | OPTIONAL, |
| lsaInformation | [25] LSAInformation | OPTIONAL, |
| lmu-Indicator | [21] NULL | OPTIONAL, |
| lcsInformation | [22] LCSInformation | OPTIONAL, |
| istAlertTimer | [26] IST-AlertTimerValue | OPTIONAL, |
| superChargerSupportedInHLR | [27] AgeIndicator | OPTIONAL, |
| mc-SS-Info | [28] MC-SS-Info | OPTIONAL, |
| cs-AllocationRetentionPriority | [29] CS-AllocationRetentionPriority | OPTIONAL, |
| sgsn-CAMEL-SubscriptionInfo | [17] SGSN-CAMEL-SubscriptionInfo | OPTIONAL, |
| chargingCharacteristics | [18] ChargingCharacteristics | OPTIONAL, |
| accessRestrictionData | [19] AccessRestrictionData | OPTIONAL, |
| ics-Indicator | [20] BOOLEAN | OPTIONAL, |
| eps-SubscriptionData | [31] EPS-SubscriptionData | OPTIONAL, |
| csg-SubscriptionDataList | [32] CSG-SubscriptionDataList | OPTIONAL, |
| ue-ReachabilityRequestIndicator | [33] NULL | OPTIONAL, |
| sgsn-Number | [34] ISDN-AddressString | OPTIONAL, |
| mme-Name | [35] DiameterIdentity | OPTIONAL, |
| subscribedPeriodicRAUTAUtimer | [36] SubscribedPeriodicRAUTAUtimer | OPTIONAL, |
| vplmnLIPAAllowed | [37] NULL | OPTIONAL, |

TABLE 5-continued

| Current ISD Arg definition | | |
|---|---|---|
| mdtUserConsent | [38] BOOLEAN | OPTIONAL, |
| subscribedPeriodicLAUtimer | [39] SubscribedPeriodicLAUtimer | OPTIONAL } |
| -- If the Network Access Mode parameter is sent, it shall be present only in | | |
| -- the first sequence if segmentation is used | | |

For the definition of the new threshold values, in the ISD Arg definition, it will be added as optional attributes istAlertOutgoingCallsCounterSameSubscriber and istAlertOutgoingCallsCounterSameDevice, see for example table 6 and table 7 below.

TABLE 6 optional attributes

```
...
istAlertOutgoingCallsCounterSameSubscriber [40]IST-
AlertOutgoingCallsCounter OPTIONAL,
istAlertOutgoingCallsCounterSameDevice [41] IST-
AlertOutgoingCallsCounter OPTIONAL
}
```

Where IST-AlertOutgoingCallsCounter may be defined as:

TABLE 7

IST-AlertOutgoingCallsCounter

```
IST-AlertOutgoingCallsCounter ::= SEQUENCE {
    istAlertOutgoingCallsCounterTimer (1) IST-
AlertOutgoingCallsCounterTimer MANDATORY,
    istAlertOutgoingCallsCounterValue (2) IST-
AlertOutgoingCallsCounterValue MANDATORY
}
    and:
    IST-AlertOutgoingCallsCounterTimer ::=
INTEGER (0...255)
    IST-AlertOutgoingCallsCounterValue ::=
INTEGER (0...255)
```

The attribute istAlertOutgoingCallsCounterSameSubscriber will indicate if the alarm for the istThreshold with value "multipleOutgoingCallsFromSameSubscriber" indicated in the ist-Alert message, has to be raised in cased that the same MSISDN reached the number of outgoing calls, from the same Location Area, this number of calls is indicated in the "IST-AlertOutgoingCallsCounterValue" and in the indicated timer, that will be in minutes specified in "IST-AlertOutgoingCallsCounterTimer".

The attribute istAlertOutgoingCallsCounterSameDevice will indicate if the alarm for the istThreshold with value "multipleOutgoingCallsFromSameDevice" has to be raised in cased that the same IMEI reached the number of outgoing calls, from the same Location Area, this number of calls is indicated in the "IST-AlertOutgoingCallsCounterValue" and in the indicated timer, that will be in minutes specified in "IST-AlertOutgoingCallsCounterTimer".

In case it is detected, by the MSC/VLR 114, when a monitored number of originating calls for one of the plurality of subscription identities exceeds the bypass threshold values, than the bypass detection system 305 may be informed 304, by the HSS 203.

Figure 4:
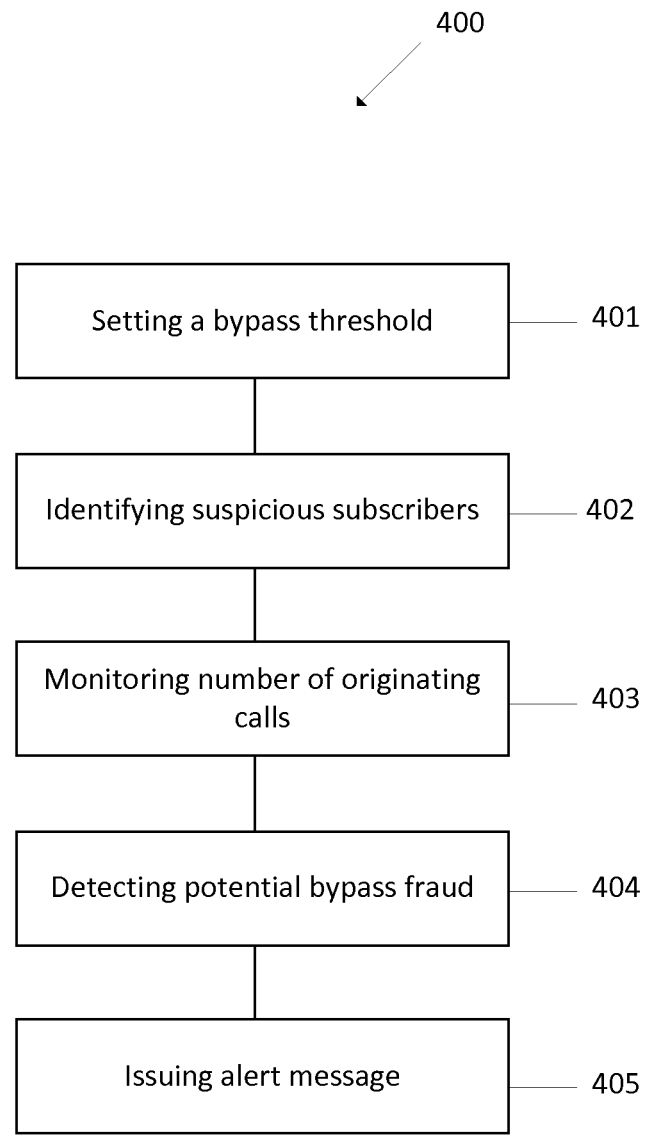
FIG. 4 is a flow chart illustrating an embodiment of method steps.

FIG. 4 is a flow chart illustrating an embodiment 400 of method steps.

Here, a method 400 is illustrated for detecting interconnect bypass by a subscription identity in a telecommunication network, wherein the telecommunication network comprises at least a mobile switching centre, MSC, serving a plurality of subscription identities The method comprises, in a first step, setting 401, by the MSC, a bypass threshold value which indicates a number of originating calls from a subscription identity per pre-defined period of time.

In a second step, the method comprises the step of identifying suspicious subscribers 402, for example retrieved from a grey list or the like.

In a third step, the method comprises monitoring 403, by the MSC, the number of originating calls from at least one of said plurality of subscription identities per the pre-defined period of time.

In a fourth step, the method comprises detecting 404, by the MSC, when the monitored number of originating calls for one of said plurality of subscription identities exceeds said bypass threshold value, and issuing 405 an alert message thereby indicating an interconnect bypass by said one of said plurality of subscription identities.

Figure 5:
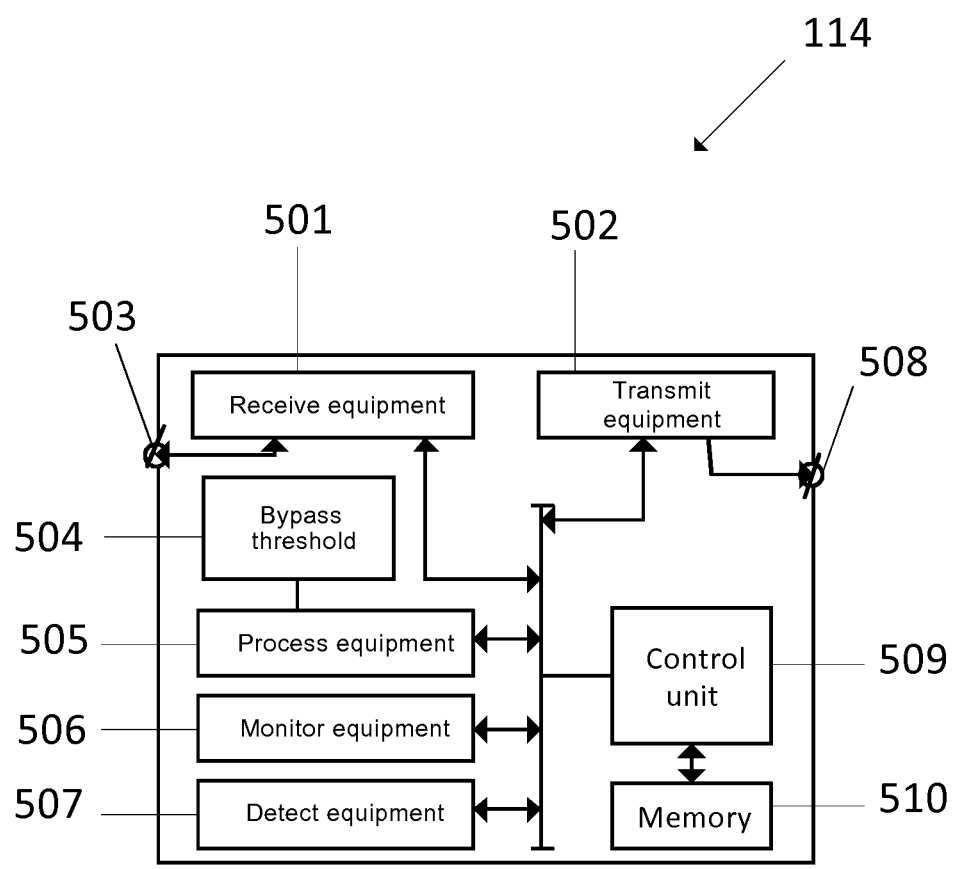
FIG. 5 is a block diagram illustrating an embodiment of a Mobile Switching Centre, MSC.

FIG. 5 is a block diagram illustrating an embodiment of a Mobile Switching Centre, MSC/VLR 114 arranged to serve a plurality of subscription identities in a telecommunication network, and for detecting interconnect bypass by any of said plurality of subscription identities in said telecommunication network.

The MSC/VLR 114 comprises a control unit 509 and a memory 510, which control unit 509 is connected to a detect equipment 507, a monitor equipment 506, a process equipment 505, a receive equipment 501 and a transmit equipment 502.

Incoming data packets or messages pass through the input terminal 503 before they reach the receive equipment 501, or receive module. Outgoing data packets or messages pass, or are sent, by the transmit equipment 502, or a transmit module, via the output terminal 508, for example towards a HSS, a radio base station, an application server or the like.

The process equipment 505 is arranged for setting a bypass threshold value 504 which indicates a number of originating calls from a subscription identity per pre-defined period of time.

The monitor equipment 506 is arranged for monitoring the number of originating calls from at least one of said plurality of subscription identities per said pre-defined period of time.

The detect equipment 507 is arranged for detecting when said monitored number of originating calls for one of said plurality of subscription identities exceeds said bypass threshold value 504, thereby indicating an interconnect bypass by said one of said plurality of subscription identities.

The core essence of the present invention is that the number of originating calls per subscription identity can be monitored in real-time in case the workload therefor is distributed. As such method for detecting an interconnect bypass is performed by an MSC.

The advantage hereof is that it is more likely that interconnect bypass gets detected, i.e. the accuracy of determining whether a subscription identity is involved in an interconnect bypass is improved substantially compared to conventional techniques.

It is a further advantage in case the bypass threshold values and/or the determination that one of the plurality of subscription identities are involved in an interconnect are communicated to and/or from the HSS via IST messages such that no additional load in the telecommunication network is introduced.

It is another advantage in case the MSC is provided with a grey list, which grey list comprises a list of subscription identities to be monitored. In such a case, it is not necessary to monitor all the subscription identities served by the MSC, but only the subscription identities comprised by the grey list. This may limit the load of the MSC considerably.

The present invention is not limited to the embodiments as disclosed above, and van be modified and enhanced by those skilled in the art beyond the scope of the present invention as disclosed in the appended claims without having to apply inventive skills.

The invention claimed is:

1. A method for detecting interconnect bypass by a subscription identity in a telecommunication network, said telecommunication network comprising at least a Mobile Switching Center (MSC), said method comprising:
 setting, by said MSC, a bypass threshold value, said bypass threshold value being an integer number;
 receiving, by said MSC, a grey list from any of a Home Subscription Server (HSS), a Home Location Register (HLR), and an Application Server (AS), and entering said grey list at said MSC, wherein said grey list contains subscription identities suspected of involvement with interconnect bypass;
 monitoring, by said MSC, for originating calls per a predefined period of time, from each of one or more subscription identities contained in the grey list that connect to the MSC; and
 detecting, by said MSC, when said number of originating calls for any one of said one or more subscription identities exceeds said bypass threshold value, and issuing an alert message, thereby indicating an interconnect bypass by said any one of said one or more subscription identities.

2. The method for detecting interconnect bypass according to claim 1, wherein receiving said grey list from said HSS comprises receiving said grey list in an Immediate Service Termination (IST) message.

3. The method for detecting interconnect bypass according to claim 1, wherein the one or more subscription identities are connected to said MSC via one or more radio base stations, each of which covers a location area, and wherein said steps of monitoring and detecting comprise:
 monitoring, by said MSC, said number of originating calls from each of the one or more subscription identities per said pre-defined period of time and per location area; and
 detecting, by said MSC, when said number of originating calls for any of the one or more subscription identities, per base station, exceeds said bypass threshold value, and issuing an alert message, thereby indicating an interconnect bypass.

4. The method for detecting interconnect bypass according to claim 1, wherein said step of setting, by said MSC, a bypass threshold value, comprises:
 receiving, from said HSS in said telecommunication network, said bypass threshold value.

5. The method for detecting interconnect bypass according to claim 4, wherein said step of receiving said bypass threshold comprises receiving said bypass threshold value in an Immediate Service Termination (IST) message.

6. The method for detecting interconnect bypass according to claim 1, wherein said pre-defined period of time is between a minute and a week.

7. The method for detecting interconnect bypass according to claim 1, wherein said step of issuing said alert message comprises issuing, by said MSC, said alert message to a network node in said telecommunication network.

8. The method for detecting interconnect bypass according to claim 7, wherein said alert message is an Immediate Service Termination (IST) message.

9. A Mobile Switching Center (MSC) arranged for operation in a telecommunication network, and for detecting interconnect bypass by a subscription identity in said telecommunication network, said MSC comprising:
 communication circuitry configured to communicatively couple said MSC to one or more other nodes in said telecommunication network; and
 processing circuitry operatively associated with said communication circuitry and configured to:
  set a bypass threshold value, said bypass threshold value being an integer number;
  receive, by said MSC, a grey list from any of a Home Subscription Server (HSS), a Home Location Register (HLR), and an Application Server (AS), and enter said grey list at said MSC, wherein said grey list contains subscription identities suspected of involvement with interconnect bypass;
  monitor for originating calls per a pre-defined time, from each of one or more subscription identifies contained in the grey list that connect to the MSC; and
  detect when said number of originating calls for any one of said one or more subscription identities exceeds said bypass threshold value, thereby indicating an interconnect bypass by said any one of said one or more subscription identities.

10. The MSC according to claim 9, wherein said processing circuitry is configured to receive said grey list from said HHS via an Immediate Service Termination (IST) message.

11. The MSC according to claim 9, wherein said processing circuitry is configured to receive said bypass threshold value from said HSS.

12. The MSC according to claim 9, wherein said pre-defined period of time is between a minute and a week.

13. The MSC according to claim 7, wherein said processing circuitry is configured to:
 issue said alert message to said HSS.

14. The MSC according to claim 13, wherein said alert message is an Immediate Service Termination (IST) message.

15. A non-transitory computer readable medium storing computer program code that, when executed by a Mobile Switching Center (MSC) arranged for operation in a telecommunication network, cause said MSC to:
 set a bypass threshold value, said bypass threshold value being an integer number;
 receive a grey list from any of a Home Subscription Server (HSS), a Home Location Register (HLR), and an Application Server (AS), and enter said grey list at said MSC, wherein said grey list contains subscription identities suspected of involvement with interconnect bypass;

monitor for originating calls per a pre-defined period of time, from each of one or more subscription identities contained in the grey list that connect to the MSC; and detect when said number of originating calls for any one of said one or more subscription identities exceeds said bypass threshold value, thereby indicating an interconnect bypass by said any one of said one or more subscription identities.

\* \* \* \* \*